(12) United States Patent
Huang et al.

(10) Patent No.: US 6,643,242 B1
(45) Date of Patent: *Nov. 4, 2003

(54) DISK CARTRIDGE SHUTTER DOOR OPENER

(75) Inventors: An-Ying Huang, Tainan Hsien (TW); Chau-Yuan Ke, Pintung Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/299,722

(22) Filed: Apr. 26, 1999

(30) Foreign Application Priority Data

Apr. 3, 1999 (TW) ........................................ 88105360 A

(51) Int. Cl.⁷ .............................................. G11B 33/02
(52) U.S. Cl. .................................... 369/77.2; 360/99.06
(58) Field of Search ............................ 369/77.1, 77.2, 369/75.1, 75.2, 291; 360/99.02, 99.06

(56) References Cited

U.S. PATENT DOCUMENTS

| | | | | |
|---|---|---|---|---|
| 4,811,137 A | * | 3/1989 | Muto et al. ................. | 369/77.2 |
| 4,953,042 A | * | 8/1990 | Yoshikawa ................. | 360/96.5 |
| 5,124,975 A | * | 6/1992 | Naoki et al. ................ | 369/291 |
| 5,485,326 A | * | 1/1996 | Chyi-Fwu et al. .......... | 360/96.5 |
| 5,537,271 A | * | 7/1996 | Kumai et al. ............. | 360/99.06 |
| 5,610,781 A | * | 3/1997 | Watanabe .................. | 360/99.06 |
| 5,790,497 A | * | 8/1998 | Hayashi ...................... | 369/77.2 |
| 5,796,697 A | * | 8/1998 | Masaki et al. ............. | 369/75.2 |
| 5,883,871 A | * | 3/1999 | Shihou ....................... | 369/77.2 |
| 6,002,658 A | * | 12/1999 | Aso et al. .................. | 369/75.1 |
| 6,009,061 A | * | 12/1999 | Davis et al. ................ | 369/77.2 |
| 6,154,431 A | * | 11/2000 | Arai et al. ................. | 369/77.2 |

* cited by examiner

Primary Examiner—William Korzuch
Assistant Examiner—Angel Castro
(74) Attorney, Agent, or Firm—J.C. Patents

(57) ABSTRACT

An opener for opening the shutter door of a disk cartridge. The opener includes an opener beam having a slot section and a pin that passes through the slot section of the opener beam to be fastened onto a base metal plate. Therefore, the opener beam is able to slide with respect to the fixed pin within the opener slot. A first slot is also formed in the base metal plate so that a slider attached to the head section of the opener beam is able to slide freely inside the slot. In addition, the opener has a spring with one end fastened to the base metal plate while the other end is fastened to a spring lock pin of the opener beam. A second slot on the base metal plate permits the spring lock pin to slide inside the slot. In an alternative design, by using pins that fasten onto the base metal plate, there is no need to form first or second slots on the base metal plate.

17 Claims, 17 Drawing Sheets ent application serial no. 88105360, filed Apr. 3, 1999, the full disclosure of which is incorporated herein by reference.

DISK CARTRIDGE SHUTTER DOOR OPENER

CROSS-REFERENCE TO RELATED APPLICATION

This application claims the priority benefit of Taiwan application serial no. 88105360, filed Apr. 3, 1999, the full disclosure of which is incorporated herein by reference.

BACKGROUND OF THE INVENTION

1. Field of Invention

The present invention relates to a shutter door opener. More particularly, the present invention relates to an opener for opening the shutter door of a disk cartridge.

2. Description of Related Art

At present, most laser disk reading machines such as DVDs or CDs can accept either bare laser disks or laser disks that are enclosed within a protective cartridge. The cartridge is able to prevent dust deposition, scratches, air moisture or unwanted illumination. However, when a disk cartridge is pushed into a laser machine, a suitable opener must be present to open the shutter door on the cartridge so that laser beam can shine onto the laser disk for performing a data-read operation. FIGS. 1A and 1B illustrate one type of conventional shutter door opener for the cartridge, and FIGS. 2A and 2B illustrate a second type of conventional shutter door opener. In general, the mechanisms of most conventional shutter door openers suffer the drawback of having too much resistance or friction. Therefore, the shutter doors are difficult to open. Furthermore, even if the internal friction is only moderate, too many components may be required making assembling very difficult. In addition, the assembled system may be so large that too much space is required to accommodate the system.

FIGS. 1A and 1B are two top views showing the opening of the shutter door of a disk cartridge using a first type of conventional opener design. The shutter door opener includes an opener beam 22 on a base metal plate 20. Two sliding slots 24 and 28 are formed in the base metal plate 20. One of the slots 24 serves as guide for the head section A of the opener beam 22 to sweep out an arc. The other slot 28 permits a latch pin attached to the opener beam 22 to sweep out an arc. Furthermore, the shutter door opener includes an extension spring 26. One end 26A of the spring 26 is hooked onto the latch pin of the opener beam 22, whereas the other end 26B is fixed onto the base metal plate 20. The opener beam 22 is able to turn relative to a rotating axis 30. In fact, one end of the opener beam 22 is fixed by a pin insert anchored to the rotating axis 30 so that the other end of the opener beam 22 is capable of moving along the slot 24. As shown in FIG. 1A, just before a disk cartridge 10 is pushed into a laser machine, the shutter door 12 on the cartridge remains closed. When the disk cartridge is pushed into the laser machine, point B on the shutter door 12 first contacts the head section A of the opener beam 22. Thereafter, when the cartridge is pushed in a little further, the head section A of the opener beam 22 sliding along slot 24 gradually drives the shutter door 12 to the left. In the meantime, the spring 26 having one end 26A hooked to the opener beam 22 be carried along in the direction of the slot 28. Finally, the shutter door 12 is fully opened as shown in FIG. 1B. Once the spring 26 is fully extended, a restorative force is provided. Therefore, as the disk cartridge 10 is drawn out, the opener beam 22 can return to its former position as shown in FIG. 1A. In the aforementioned design, the shutter door is opened using the movement of the opener beam 22 along a small radial arc. In other words, the opener beam 22 has only one degree of freedom. To prevent the cartridge from being stuck inside the laser machine, the opener beam 22 must have a considerable length. Hence, extra room for accommodating the wide sweep of the opener beam 22 must be set aside, which is quite demanding for a laser machine having limited internal space.

FIGS. 2A and 2B are two top views showing the opening of the shutter door of a disk cartridge using a second type of conventional opener design. The shutter door opener is very similar to the one in FIGS. 1A and 1B except that one end of the opener beam 22' is not fixed to the base metal plate 20. Instead, a sliding slot 30' is formed for the end section of the opener beam 22' to slide along. In this design, a pin is attached to the respective front section and the end section of the opener beam 22'. Hence, the entire opener beam 22' is capable of sliding along slots 24' and 30' in the process of opening the shutter door 12. In fact, the two slots 24' and 30' serves as end constraints for the opener beam 22' so that a set track is followed by the opener beam 22'. However, this type of design requires detailed calculations for relative positioning of the two slots 24' and 30'. Otherwise, the opener may be jammed in the middle so that the shutter door 12 is not fully opened. Moreover, this type of opener produces greater friction, too.

In conclusion, the first type of conventional door opener tends to occupy too much space, and the second type has such complex moving parts that the cartridge door may be jammed.

In light of the foregoing, there is a need to produce a better door opener for opening the shutter door of a disk cartridge.

SUMMARY OF THE INVENTION

Accordingly, the present invention is to provide a shutter door opener for opening the shutter door of a disk cartridge such that the sliding area demanded by the opener beam is reduced. Hence, the shutter door opener does not occupy too much room. Furthermore, the degree of opening of the shutter door can be controlled by tailoring the curvature and profile of the sliding slots, unlike the fixed arc trajectory utilized by a conventional opener beam.

Another aspect of this invention is to provide a shutter door opener having the same door-opening capacity as a conventional unit for opening the shutter door of a disk cartridge, but with fewer components. Hence, the shutter door opener can be assembled quickly and production cost can be reduced.

To achieve these and other advantages and in accordance with the purpose of the invention, as embodied and broadly described herein, the invention provides a shutter door opener for opening the shutter door of a disk cartridge. The shutter door opener is generally installed inside a laser disk reader on a chucking plate. The shutter door opener for opening the shutter door of a disk cartridge comprises a door-opening component. The door-opening component includes an opener beam and a slot on the opener beam for sliding the opener beam. The opener beam further includes a slider at the head section of the opener beam, and a pin that passes through a slot of the opener beam and fastened to the chucking plate. Hence, the opener beam is free to move relative to the fixed pin and is only constrained by the slot. There is a first slot in the chucking plate. The first slot is designed in such a way that the slider at the head section of the opener beam is able to latch onto and slides freely along the slot. The opener further includes an extensible element with one end fixed onto the chucking plate while the other end is fixed onto a hook attached to the mid-section of the opener beam. The opener also has a second slot on the chucking plate. The second slot allows the hook on the opener beam freely slide along.

In a second embodiment, the invention provides a shutter door opener for opening the shutter door of a disk cartridge. The shutter door opener is installed on a chucking plate. A first pin insert and a second pin insert are fixed to the chucking plate. The shutter door opener includes an opener beam, a slot beam, a connecting beam and an extensible element. The opener beam has a first end and a second end. The first end of the opener beam is coupled to the first fixed pin insert so that the opener beam is capable of rotating about the first pin. The slot beam has two ends and a slot along the mid-line section. The second fixed pin insert passes through the slot of the slot beam so that the slot beam is able to move past the second pin insert guided by the slot. One end of the slot beam is coupled to a section between the first and the second end of the opener beam, and the other end of the slot beam is coupled to one end of the connecting beam. Besides joining to the slot beam, the other end of the connecting beam is coupled to the first end of the opener beam. One end of the extensible element is fastened onto the opener beam near its mid-section while the other end is fastened to the chucking plate.

As a disk cartridge is placed into a laser disk reader, the second end of the opener beam first touches the shutter door. The opener beam then rotates about the first pin. At the same time, the slot beam is also capable of sliding past the second pin. Consequently, the shutter door of the disk cartridge is opened by the opener beam.

In a third embodiment, the invention provides a shutter door opener for opening the shutter door of a disk cartridge. The shutter door opener is installed on a chucking plate. A first pin insert and a second pin insert are fixed to the chucking plate. The shutter door opener includes an opener beam, a slot beam and an extensible element. The opener beam has a first end, a second end and a first slot. The first pin passes through the first slot in the opener beam so that the opener beam is capable of sliding past the first pin. The slot beam also has a first end, a second end and a second slot. The second pin passes through the second slot of the slot beam so that the slot beam is also capable of sliding past the second pin. The second end of the slot beam is coupled to the beam opener somewhere between its first and the second end. One end of the extensible element is fastened onto the opener beam near its mid-section while the other end is fastened to the chucking plate.

As a disk cartridge is put into a laser disk reader, the second end of the opener beam first touches the shutter door. The opener beam, guided by the first slot, turns and slides relative to the first pin. Concurrently, the slot beam, guided by the second slot, also slides relative to the second pin. Consequently, the shutter door of the disk cartridge is opened by the opener beam.

In this invention, the opener beam of the shutter door opener is capable of horizontal movement as well as rotation at the same time. Since area swept out by the opener beam is smaller, less space is needed to accommodate the shutter door opener inside a laser disk reader.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
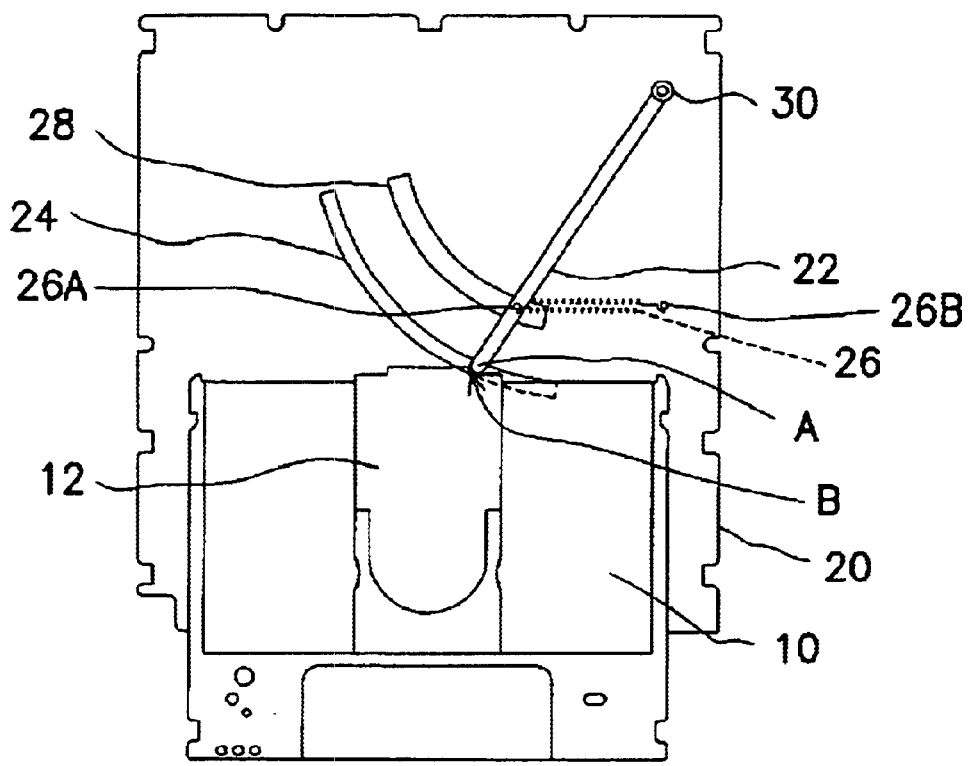
FIGS. 1A and 1B are two schematic top views showing the opening of the shutter door of a disk cartridge using a first type of conventional opener design.
Figure 1B:
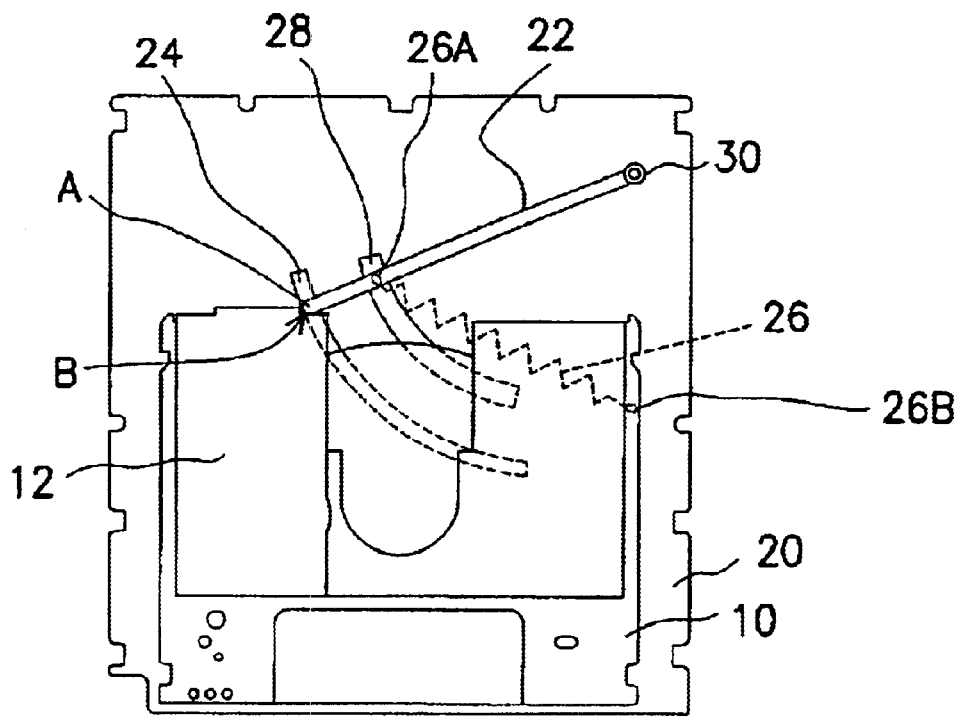
Figure 2A:
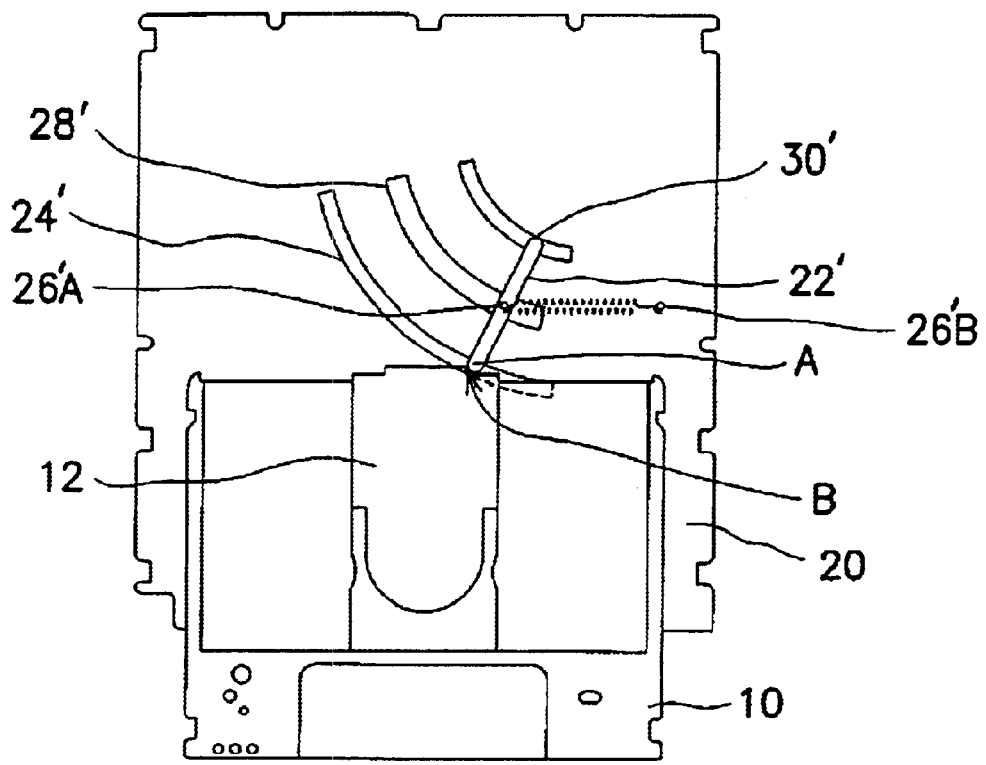
FIGS. 2A and 2B are two schematic top views showing the opening of the shutter door of a disk cartridge using a second type of conventional opener design.
Figure 2B:
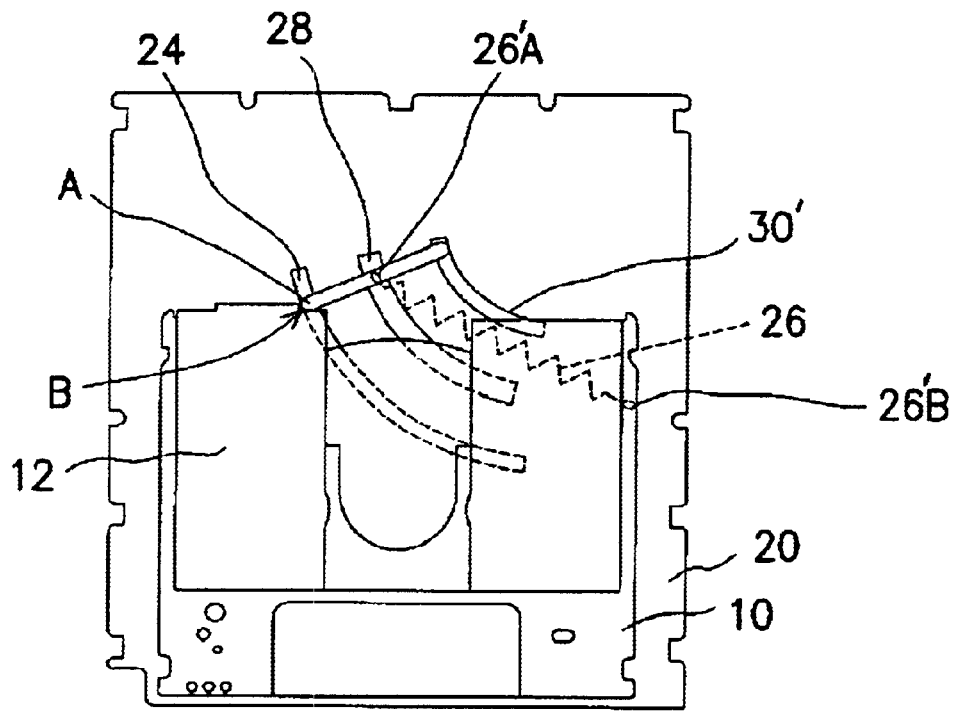

Reference will now be made in detail to the present preferred embodiments of the invention, examples of which are illustrated in the accompanying drawings. Wherever possible, the same reference numbers are used in the drawings and the description to refer to the same or like parts.

Figure 3A:
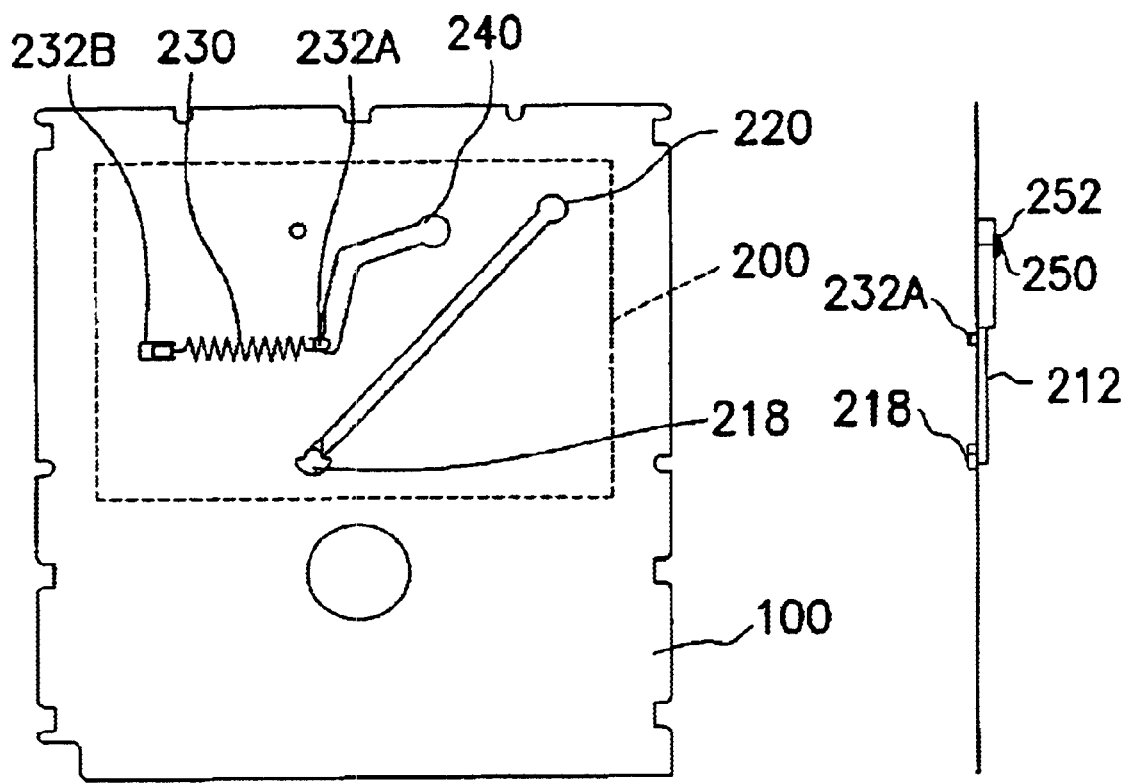
FIGS. 3A through 3C are the respective schematic top, side and bottom views showing a shutter door opener according to a first preferred embodiment of this invention.
Figure 3B:
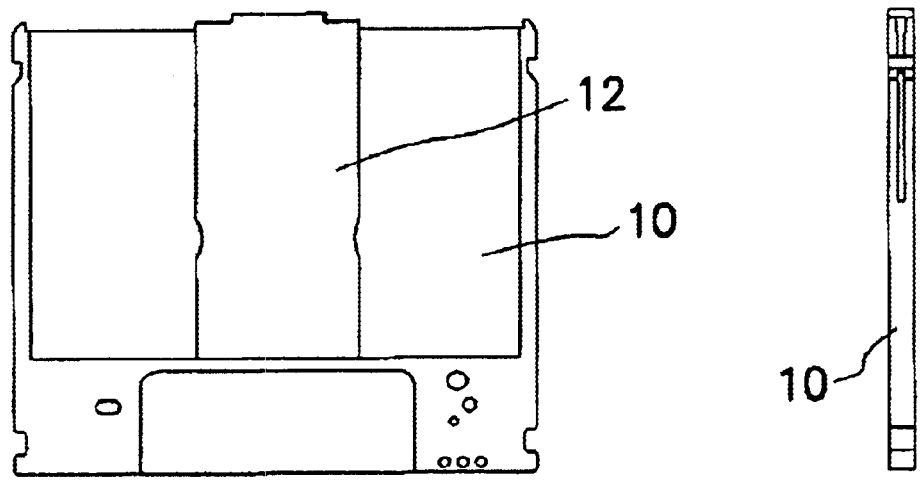
Figure 3C:
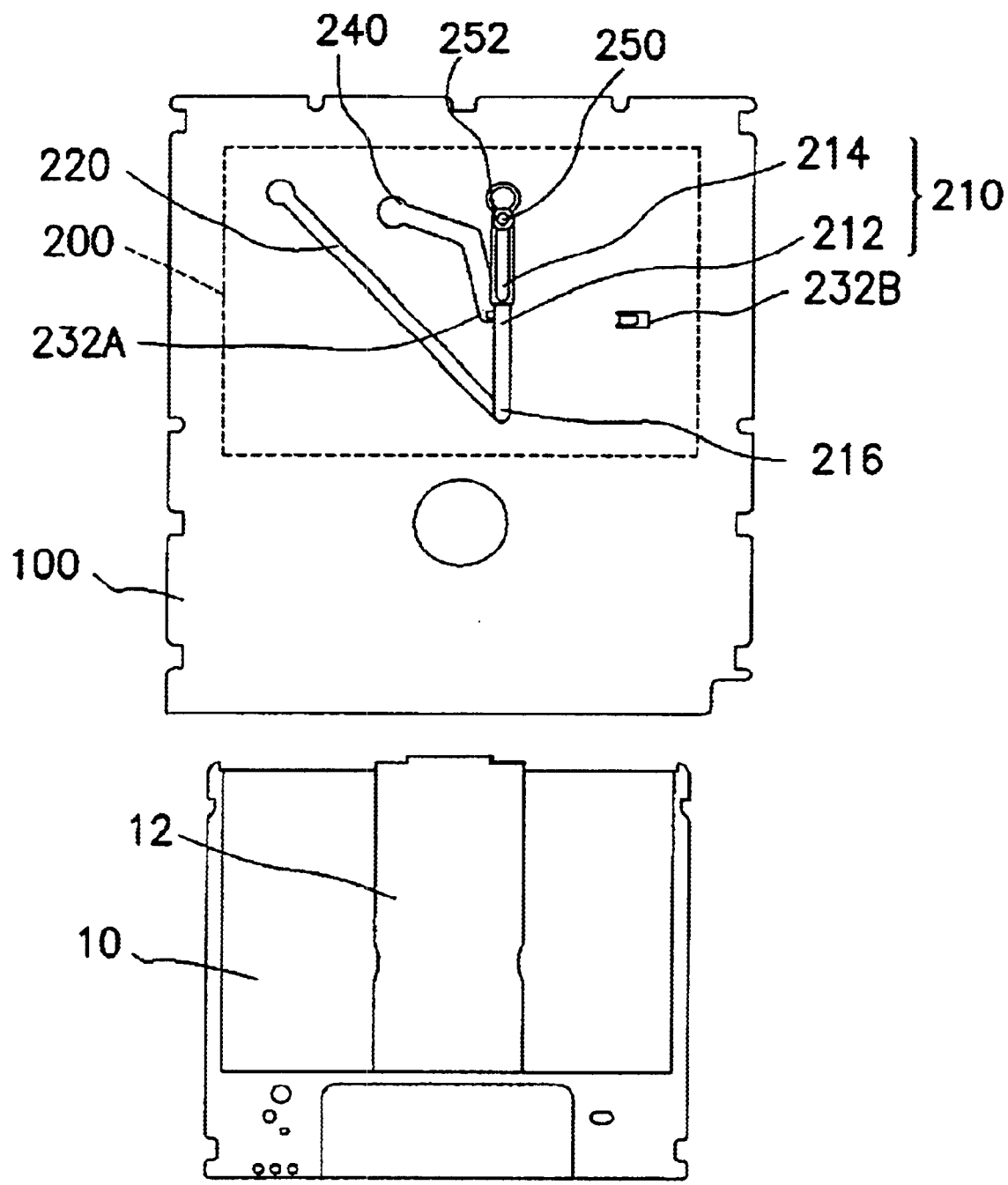

FIGS. 3A through 3C are the respective top, side and bottom views showing a shutter door opener 200 according to a first preferred embodiment of this invention. The opener 200 is suitable for opening the shutter doors of any cartridge so that the data disk inside can be read by a disk reader. The disk reader should have a chucking plate 100, and the shutter door opener 200 is mounted on top of the chucking plate 100. The chucking plate is a base metal plate. In the first embodiment, the shutter door opener 200 comprises an opener beam 210, a first slot (chucking plate slot) 220 and a spring 230.

Figures 4A, 4B, 4C:
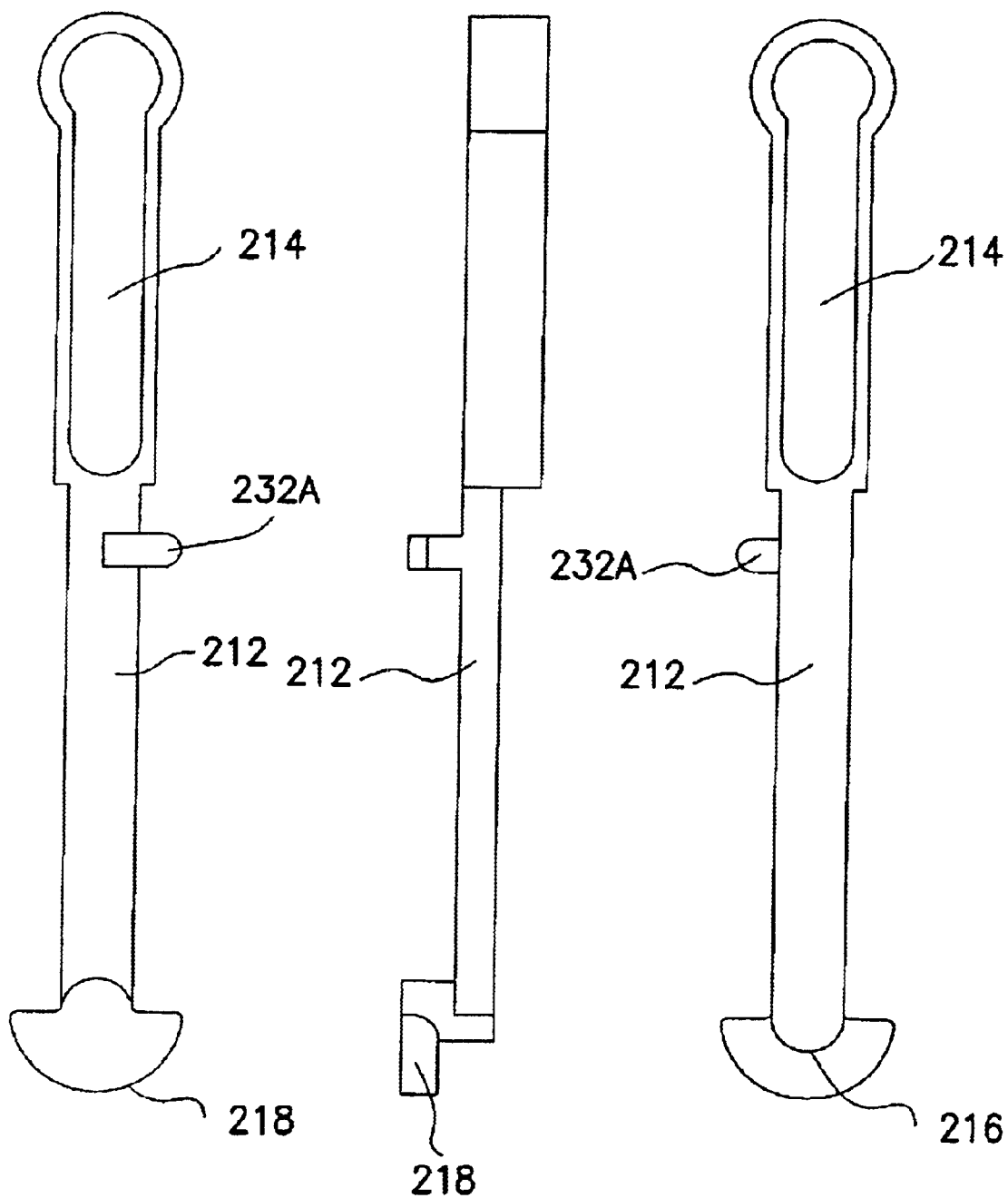
FIGS. 4A through 4C are the respective schematic top, side and bottom views showing the opener beam used in the first preferred embodiment of this invention.

FIGS. 4A through 4C are the respective top, side and bottom view showing the opener beam 210 used in the first preferred embodiment of this invention. The opener beam 210 includes an opener beam portion 212 and a slot portion 214. The head 216 of the opener beam portion 212 further includes a slider plate 218. A pin 250 passing through the slot of the opener beam 210 is fixed onto the chucking plate 100. There is a C type retainer ring 252 at the other end of the pin 250 that prevents the opener beam 210 from dislocating. Hence, the slot portion 214 of the opener beam 210 is able to move freely relative to the pin 250. The opener beam 210 can be made by injection technique using plastic or some other material.

The first slot 220 on the chucking plate 100 permits the slider at the head of the opener beam 210 to be engaged firmly with the first slot 220 so that the opener beam 210 can slide along smoothly. One end of the spring 230 is hooked onto a spring lock pin 232A on the opener beam portion 212 of the opener beam 210. The other end of the spring 230 is fastened to another spring lock pin 232B on the chucking plate 100. In addition, the chucking plate 100 further includes a second slot (a V-shaped slot in the figures) 240. The second slot 240 permits the end section of the spring lock pin 232A to slide along the slot freely. The profile and curvature of the first slot (chucking plate slot) 220 can be designed according to the degree of door opening desired. In FIG. 3C, the first slot 220 is shown to have a linear track. However, this should not be regarded as a restriction of this invention because tracks of other shape and curvature can easily fit, as well. The purpose of having the second slot 240 is to permit the end section of the spring lock pin 232A to slide along the slot. As shown in FIGS. 3A and 3C, the second slot has a V-shaped profile. Similarly, since the V-shaped slot is used as an illustration only, a second slot 240 having a different shape is possible.

Figures 5A, 5B:
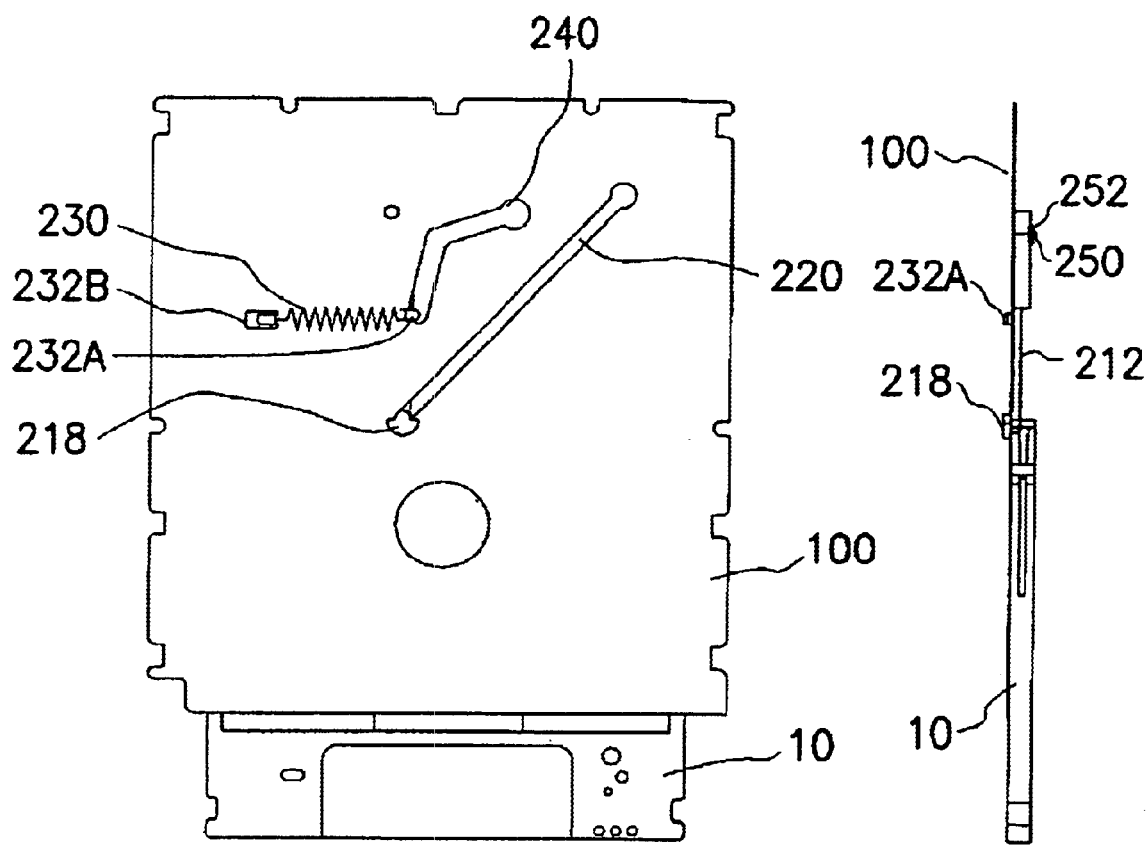
FIGS. 5A through 5C are the respective schematic top, side and bottom views showing the shutter door of a disk cartridge just touching the opener beam of the shutter door opener according to the first preferred embodiment of this invention.
Figure 5C:
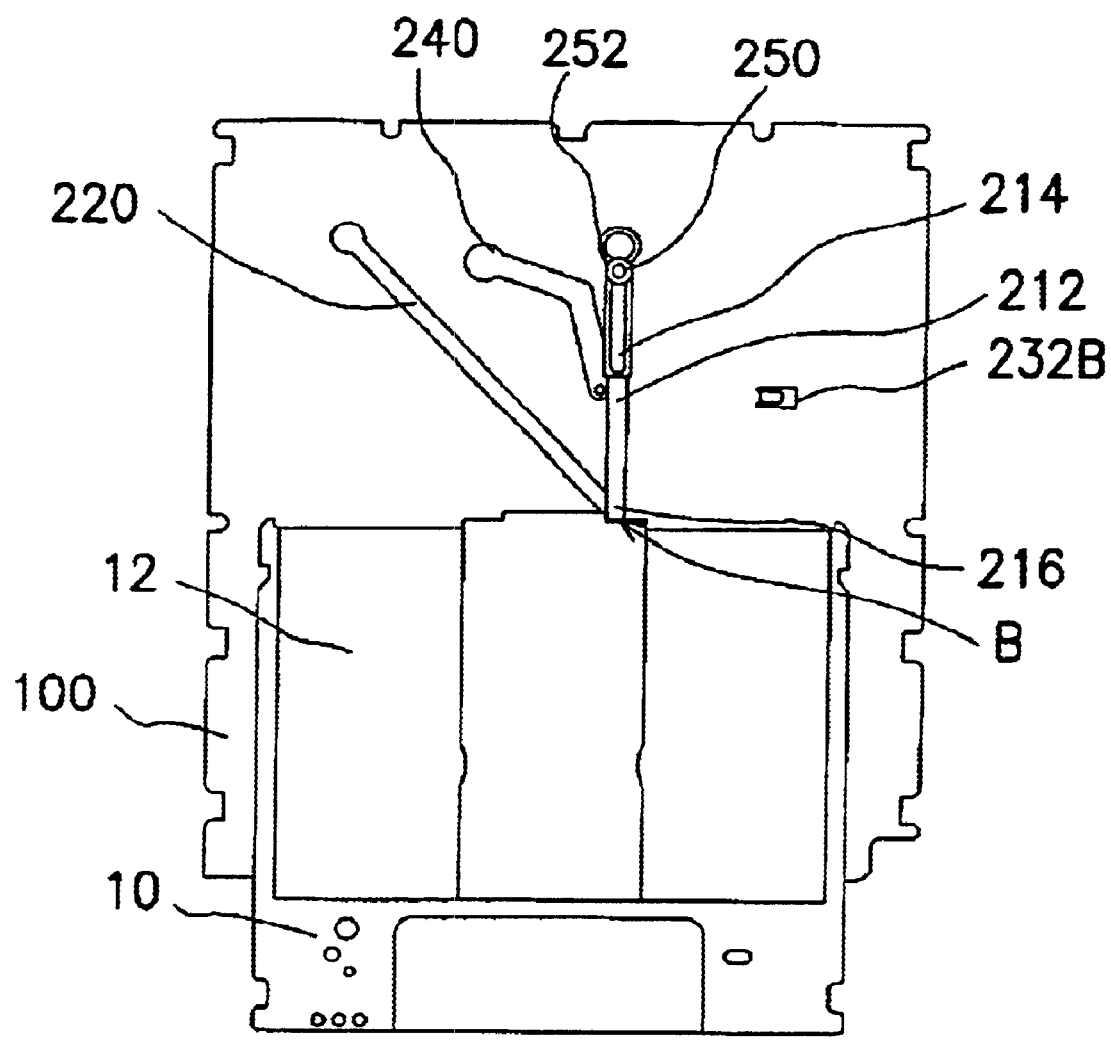

FIGS. 5A through 5C are the respective top, side and bottom views showing the shutter door of a disk cartridge 10 just touching the opener beam 212 of the shutter door opener according to the first preferred embodiment of this invention. To simplify the following description, only the chucking plate 100 and the shutter door opener 200 inside the disk cartridge holder of a disk reader are fully drawn. Components that are irrelevant to the present invention are left out. Due to tension produced by the spring 230, the opener beam 212 remains at an initial position as shown in FIG. 5A through 5C.

As the cartridge 10 is gradually pushed into the laser disk reader along the chucking plate 100, the head section 216 of the opener beam 212 first comes in contact with the shutter door 12 of the cartridge at point B. Subsequent pushing causes the opener beam 212 to move along the first slot 220. Hence, the shutter door 12 gradually slides open. In the meantime, the spring 230 gradually extends and the end section of the spring lock pin 232A is able to slide freely within the constraint of the second slot 240.

At the same time, the slot 214 on the opener beam 212 can slide relative to the pin 250. Due to the presence of the slot 220 on the chucking plate 100 and the slot 214 on the opener beam 212, the opener beam 212 is able to adjust its position automatically. In other words, the opener beam 212 is able to translate as well as rotate simultaneously during the shutter door 12 opening process. The degree of freedom permitted by the embodiment of this invention is one more than a conventional door opener (capable of translating and rotating instead of just rotating in a conventional opener). Consequently, area swept out by the opener beam 212 is lowered considerably, and hence less space is required to accommodate the door opener within the disk reader. In addition, little force is required to push the cartridge 10 into the disk reader. Since friction between elements of the door opener assembly in this invention is less than that of a conventional opener, the cartridge 10 is less frequently jammed.

Figures 6A, 6B:
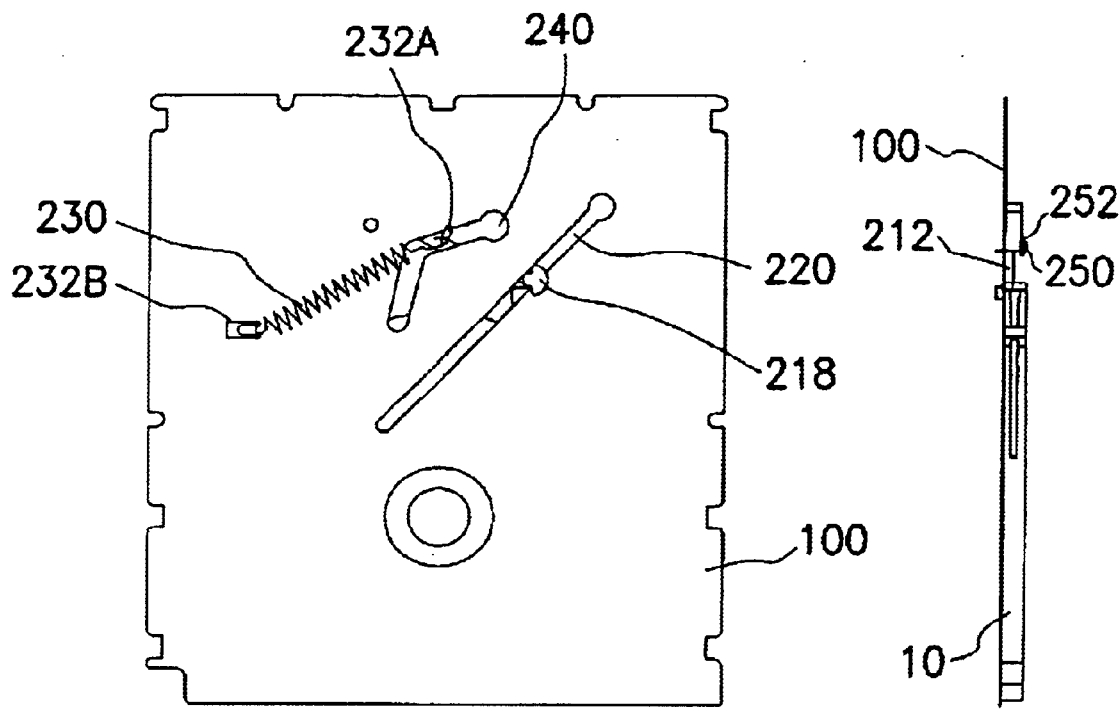
FIGS. 6A through 6C are the respective schematic top, side and bottom views showing the shutter door of the disk cartridge fully opened using the shutter door opener according to the first preferred embodiment of this invention.
Figure 6C:
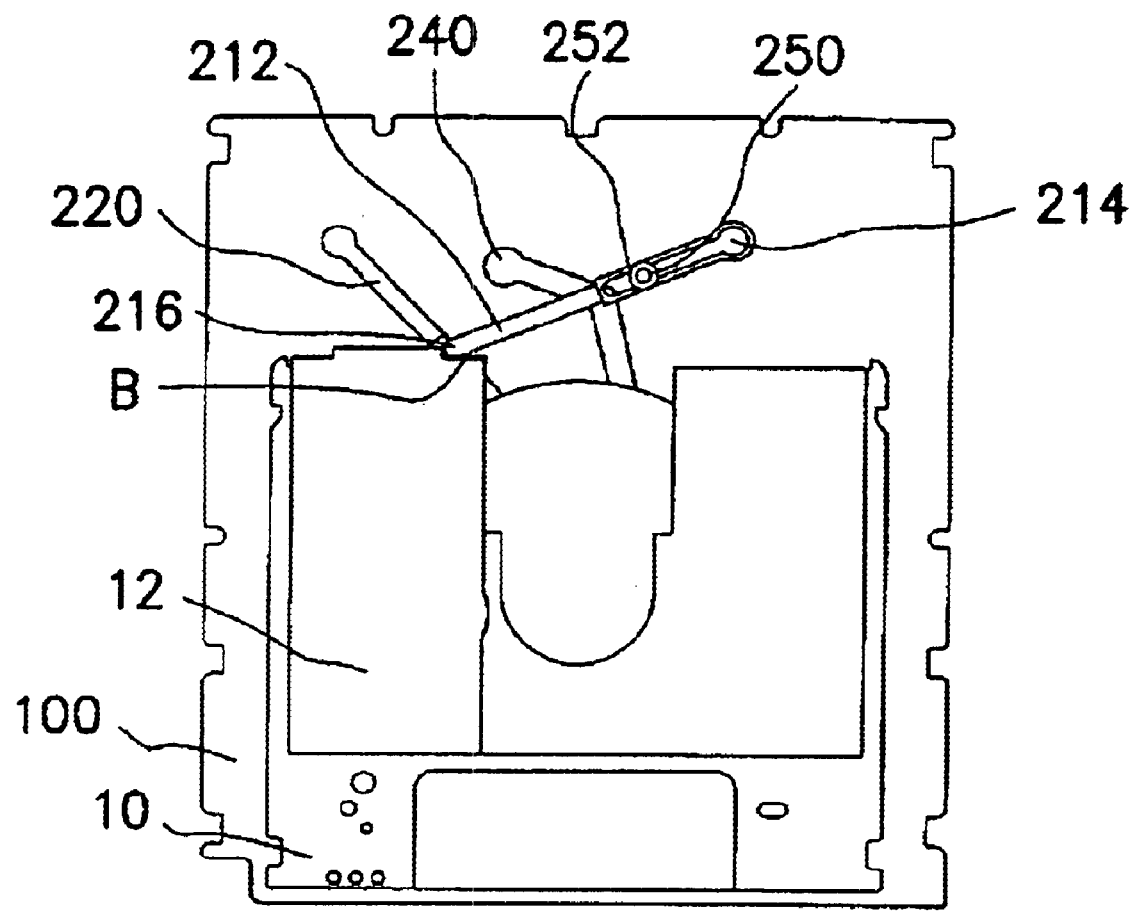

FIGS. 6A through 6C are the respective top, side and bottom view showing the shutter door 12 of the disk cartridge 10 fully opened using the shutter door opener according to the first preferred embodiment of this invention. The shutter door 12 is completely opened via the opener beam 212. As shown in FIG. 6A, the overall extended length of the spring 230 is only moderate compared with the spring of a conventional opener. Consequently, the spring 230 is not permanently deformed so readily, and so its useful life is longer.

When the cartridge is retracted from the disk cartridge holder inside the disk reader, the restoring force produced by the spring 230 returns the opener beam 212 to its initial position. Hence, the shutter door 12 is again closed as shown in FIG. 5C.

Figure 7:
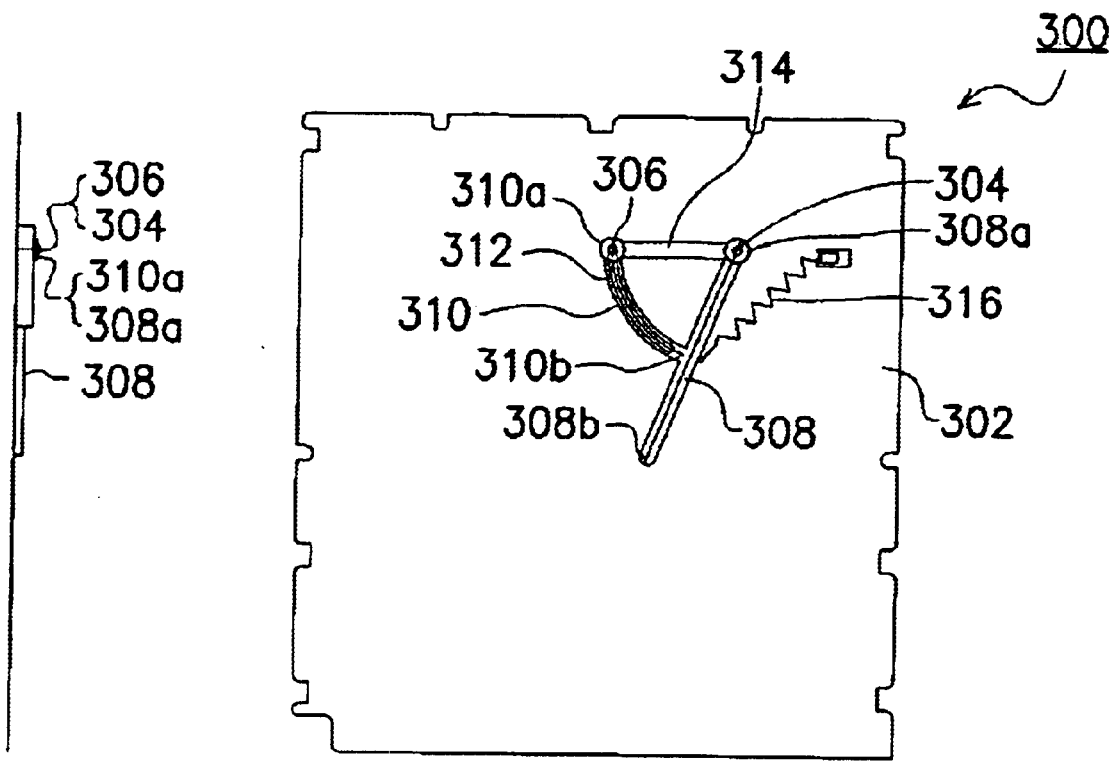
FIG. 7 is a schematic top, front and side views showing a shutter door opener according to a second preferred embodiment of this invention.
Figure 7:
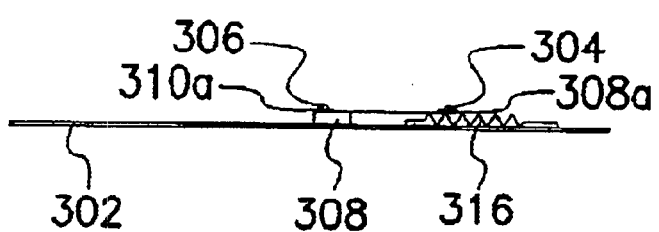

FIG. 7 is a top, front and side views showing a shutter door opener 300 according to a second preferred embodiment of this invention.

As shown in FIG. 7, the shutter door opener 300 is mounted on a chucking plate 302 having a fixed first pin 304 and a fixed second pin 306. The shutter door opener 300 comprises an opener beam 308, a slot beam 310, a connecting beam 314 and an extensible element 316. The opener beam 308 has two ends: a first end 308a and a second end 308b. The first end 308a of the opener beam 308 is pinned by the first pin 304 to form a pivot point so that the entire beam 308 is able to rotate. The slot beam 310 also has a first end 310a and a second end 310b in addition to a slot 312 along the mid-line section of the beam. Furthermore, the second pin 306 passes through the slot 312 so that the slot beam 310 is able to move relative to the pin 306. The second end 310b of the slot beam 310 is coupled to a section between the first end 308a and the second end 308b of the opener beam 308. The first end 310a of the slot beam 310 is coupled to one end of the connecting beam 314, and the other end of the connecting beam 314 is coupled to the first end 308a of the opener beam 308. Finally, one end of the extensible element 316 is fastened to the opener beam 308 while the other end is fastened to the chucking plate 302.

The aforementioned opener beam 308, slot beam 310 and the connecting beam 314 can be made in one piece by a mold injection method using plastic material. On the other hand, the chucking plate 302 can be a base metal plate. The extensible element 316 can be a tension spring. In addition, the slot 312 surface of the slot beam 310 and the outer surface of pin 306 should be as smooth as possible so as to reduce the friction between the pin 306 and the slot 312. Furthermore, retainer rings can be put around the head of the pins 304 and 306 for limiting the distance between the shutter door opener 300 and the chucking plate 302.

The second embodiment of the invention is different from the first embodiment in that no slots are formed in the chucking plate 302. Instead, a slot 312 is formed on a slot beam 310, and the shutter door opener 300 is attached to the chucking plate 302 via two pins 304 and 306. Consequently, mechanical strength of the chucking plate 302 increases. Furthermore, if there are no open slots on the chucking plate 302, noise due to air current flowing through those slots when the disk is spinning at a high speed inside the cartridge holder is absent.

Figure 8A:
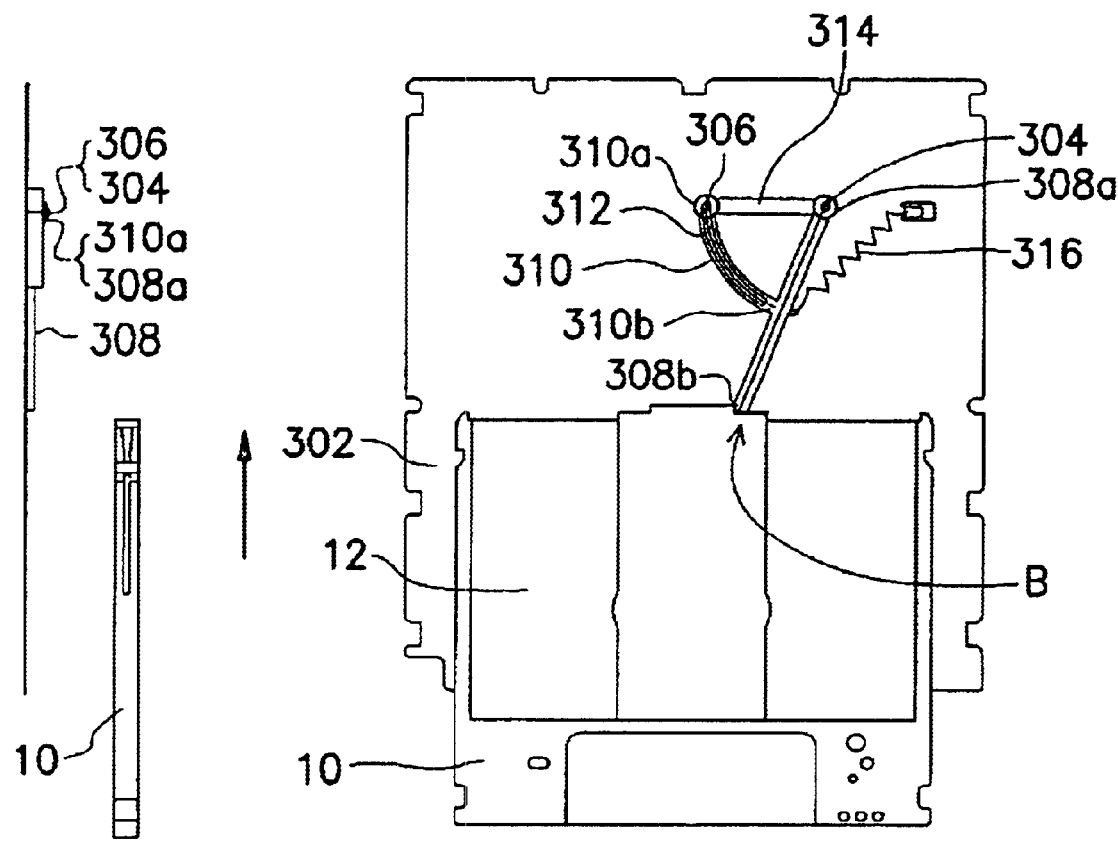
FIGS. 8A through 8C are the respective initial, intermediate and final positions of the shutter door of the disk cartridge being opened by the shutter door opener according to the second preferred embodiment of this invention.
Figure 8A:
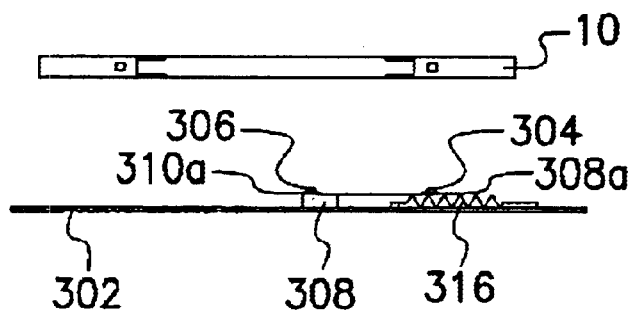
Figure 8B:
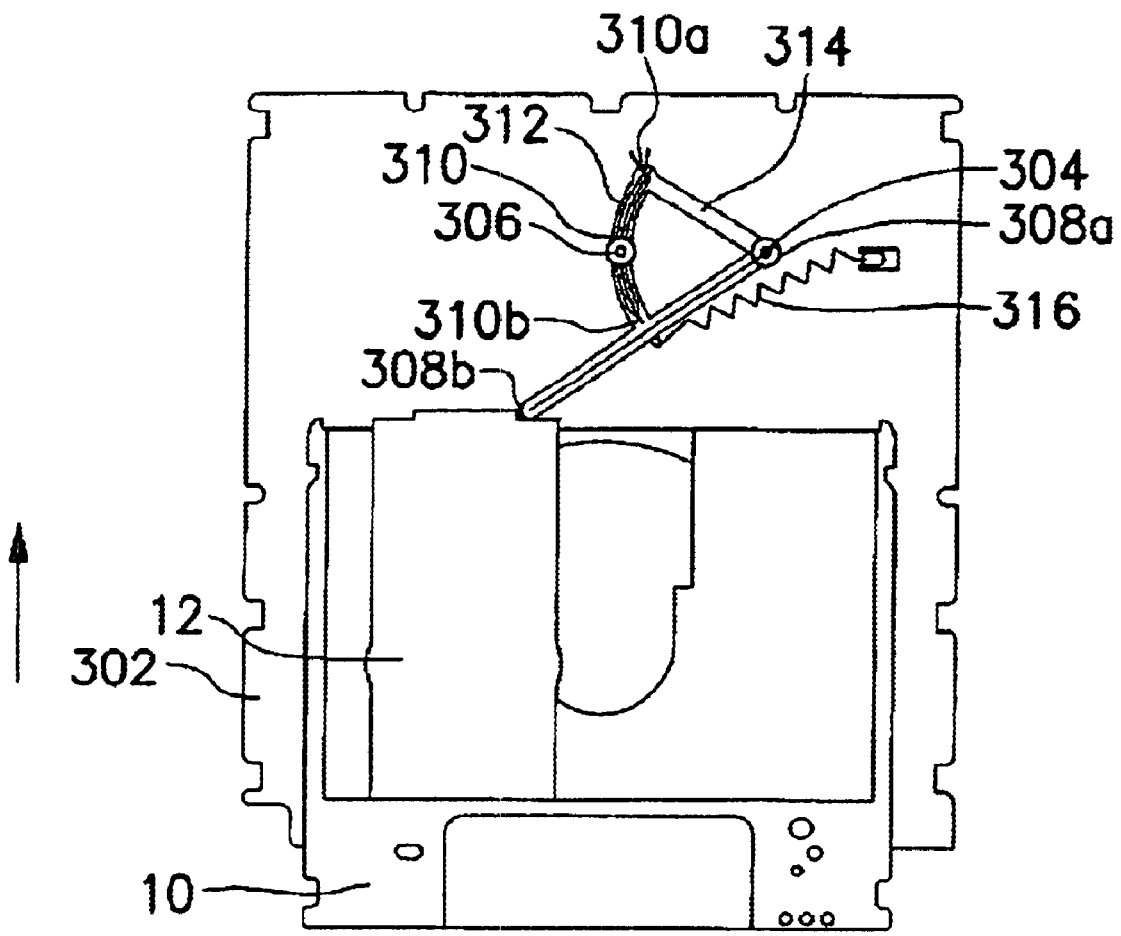
Figure 8C:
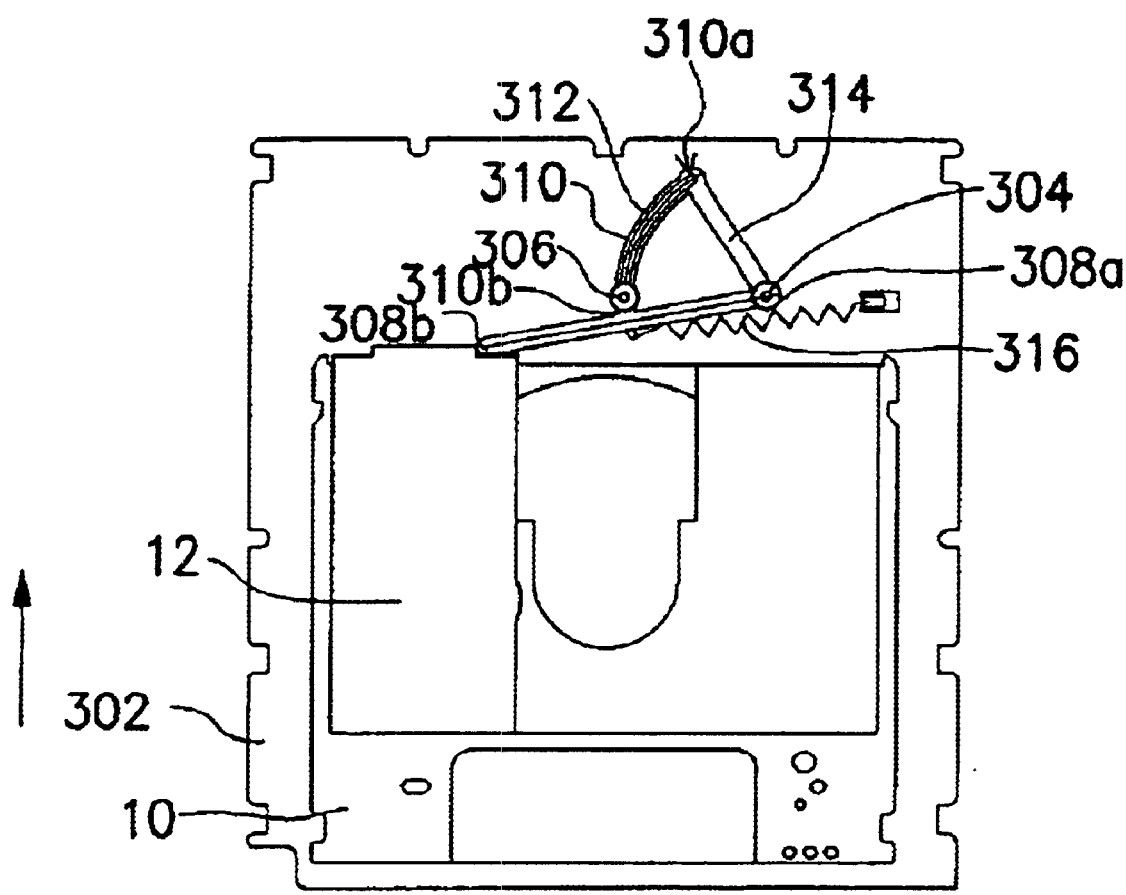

FIGS. 8A through 8C are the respective initial, intermediate and final positions of the shutter door 12 of the disk cartridge 10 being opened by the shutter door opener 300 according to the second preferred embodiment of this invention. First, as shown in FIG. 8A, the disk cartridge 10 is pushed into the cartridge holder of the disk reader (not shown). The front end 308b of the opener beam 308 is shown to be touching point B of the shutter door 12. As the cartridge 10 is further pushed, the opener beam 308 starts to rotate about the pin 304 so that the shutter door 12 starts to open.

In FIG. 8B, the opener beam 308 is shown to open the shutter door 12 a little bit more. In the meantime, the slot beam 310 through slot 312 slide past the second pin 306 in the direction indicated by an arrow. At the same time, the extensible element 316 extends a little farther.

In FIG. 8C, the slot beam 310 continues to slide past the second pin 306 following the direction indicated by the arrow. Finally, the movement stops when the second pin 306 has reached the very end of the slot 312 near the second end 310b of the slot beam 310. The shutter door 12 is now fully opened inside the disk reader. Since the extensible element 316 is now fully stretched, a potential restorative force is present. Now that the shutter door on the cartridge is fully opened, data can be read out or written into the disk. When the cartridge 10 is no longer needed, it can be retracted back. As soon as the disk cartridge 10 is pulled out, the restorative force provided by the extensible element 316 is able to return the shutter door opener 300 to its former configuration.

Note that the number of pins on the chucking plate is not restricted to two, as shown in the illustration. For reasons such as maintaining the distance between the shutter door opener and the chucking plate or others, the number of pins put on the chucking plate can be increased as long as movement and functionality of the opener beam remains. In addition, a matching number of slots for accommodating the pins can also be formed.

Figure 9:
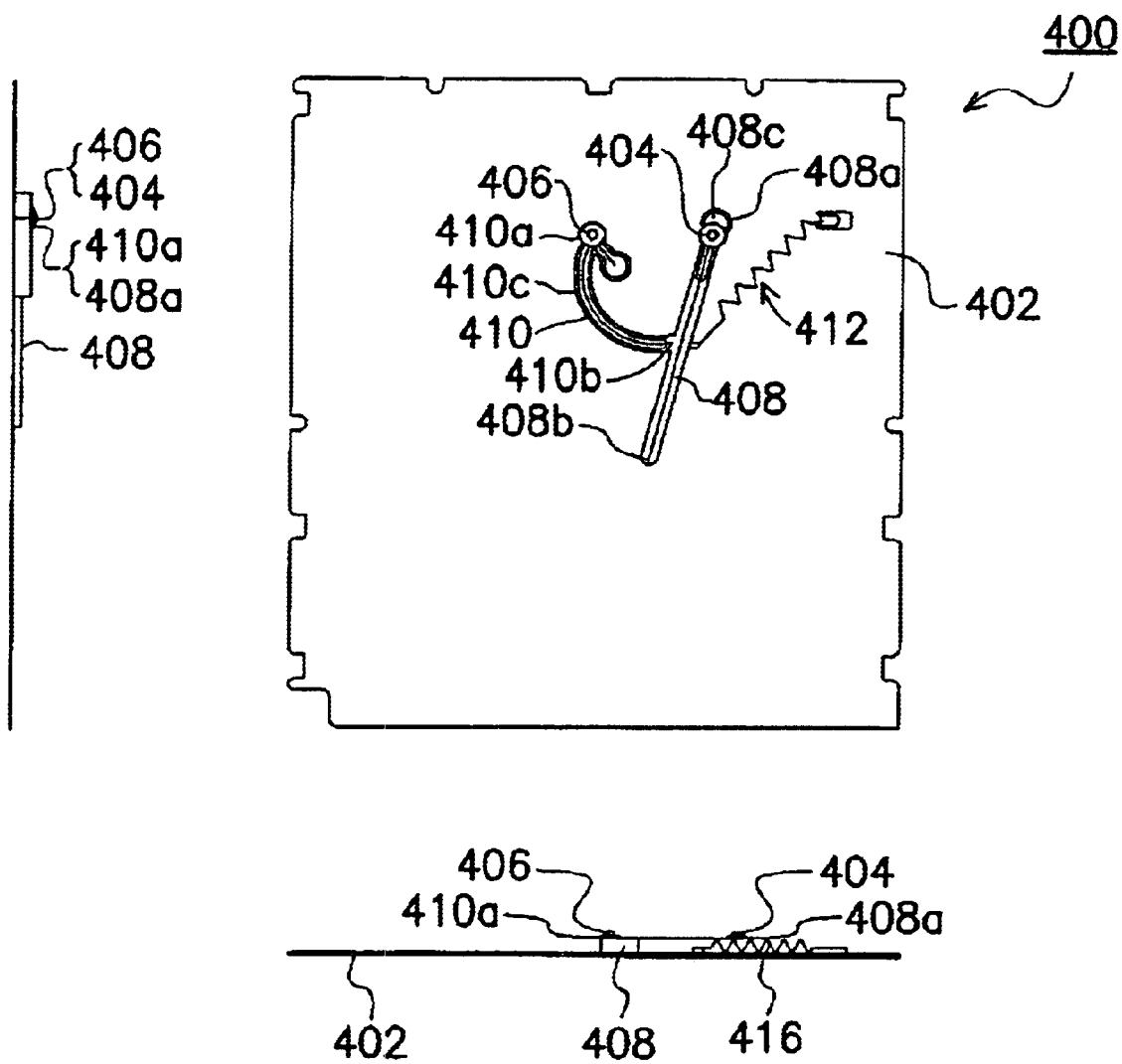
FIG. 9 is a schematic top, front and side views showing a shutter door opener according to a third preferred embodiment of this invention.

FIG. 9 is a schematic top, front and side views showing a shutter door opener 400 according to a third preferred embodiment of this invention.

As shown in FIG. 9, the shutter door opener 400 is mounted on a chucking plate 402 having a fixed first pin 404 and a fixed second pin 406. The shutter door opener 400 comprises an opener beam 408, a slot beam 410 and an extensible element 412. The opener beam 408 has two ends, a first end 408a and a second end 408b, and a first slot 408c. The first pin 404 passes through the first slot 408c. Consequently, the opener beam 408 is able to slide past the first pin 404. The slot beam 410 also has a first end 410a and a second end 410b in addition to a second slot 410c along the midline line section of the beam. Furthermore, the second pin 406 passes through the second slot 410c so that the slot beam 410 is able to move relative to the pin 406. The second end 410b of the slot beam 410 is coupled to a section between the first end 408a and the second end 408b of the opener beam 408. Finally, one end of the extensible element 412 is fastened to the opener beam 408 while the other end is fastened to the chucking plate 402.

The aforementioned opener beam 408 and slot beam 410 can be made in one piece by an injection molding method using plastic material. On the other hand, the chucking plate 402 can be a base metal plate. The extensible element 412 can be a tension spring. In addition, surface of the first slot 408c, surface of the second slot 410c and the outer surface of pins 404 and 406 should be as smooth as possible for reducing friction. Furthermore, retainer rings can be put around the head of the pins 404 and 406 for limiting the distance between the shutter door opener 400 and the chucking plate 402.

The third embodiment of the invention is different from the second embodiment in that the opener beam 408 has an additional slot 408c. Without a fixed pivotal point for rotation, the path taken by the opener beam 408 is more flexible and hence capable of translational and rotational movement at the same time. Therefore, area swept out by the opener beam 408 can be reduced and the shutter door opener 400 can be accommodated by less space.

Figure 10A:
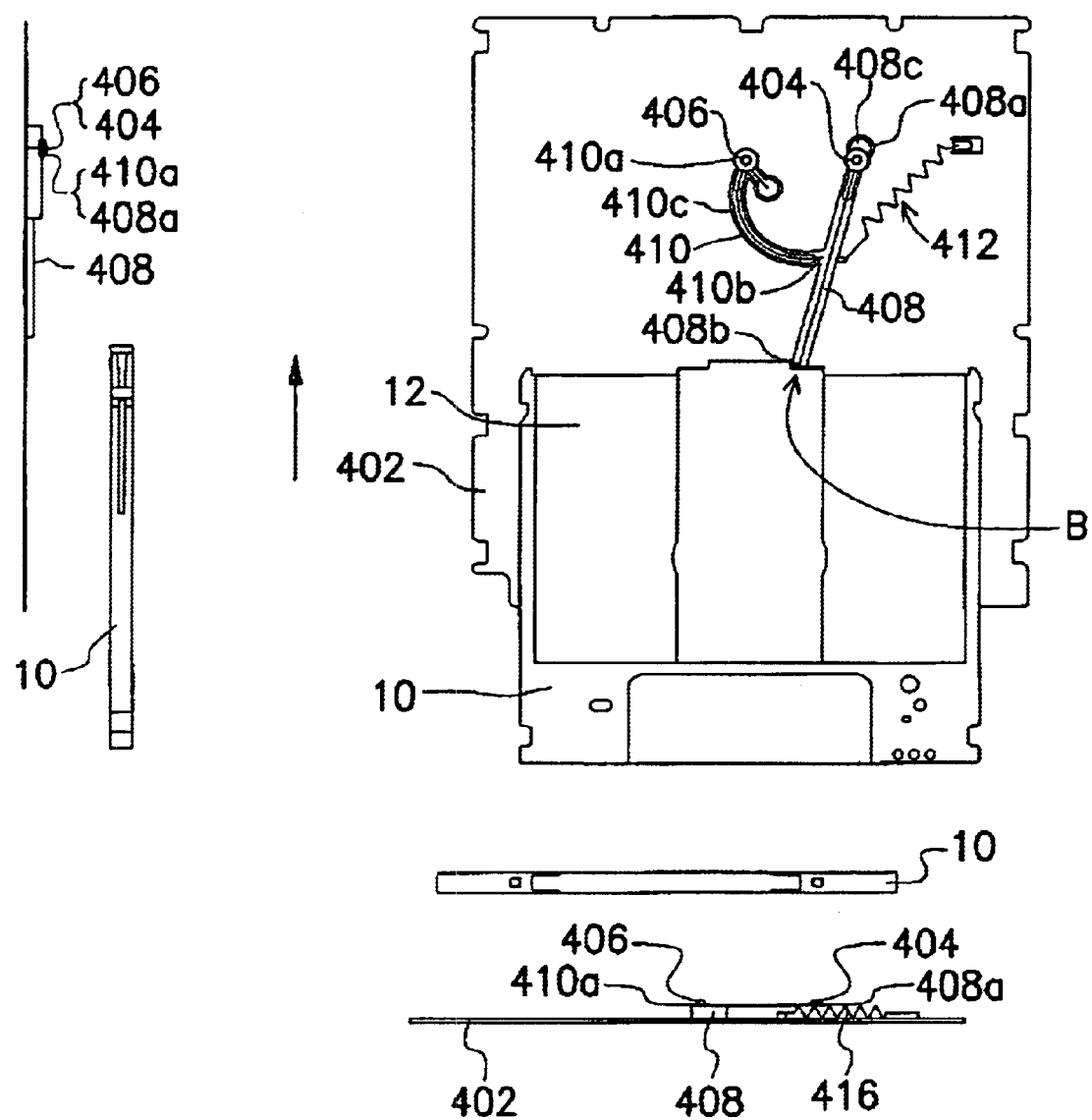
FIGS. 10A through 10C are the respective initial, intermediate and final positions of the shutter door of the disk cartridge being opened by the shutter door opener according to the third preferred embodiment of this invention.
Figure 10B:
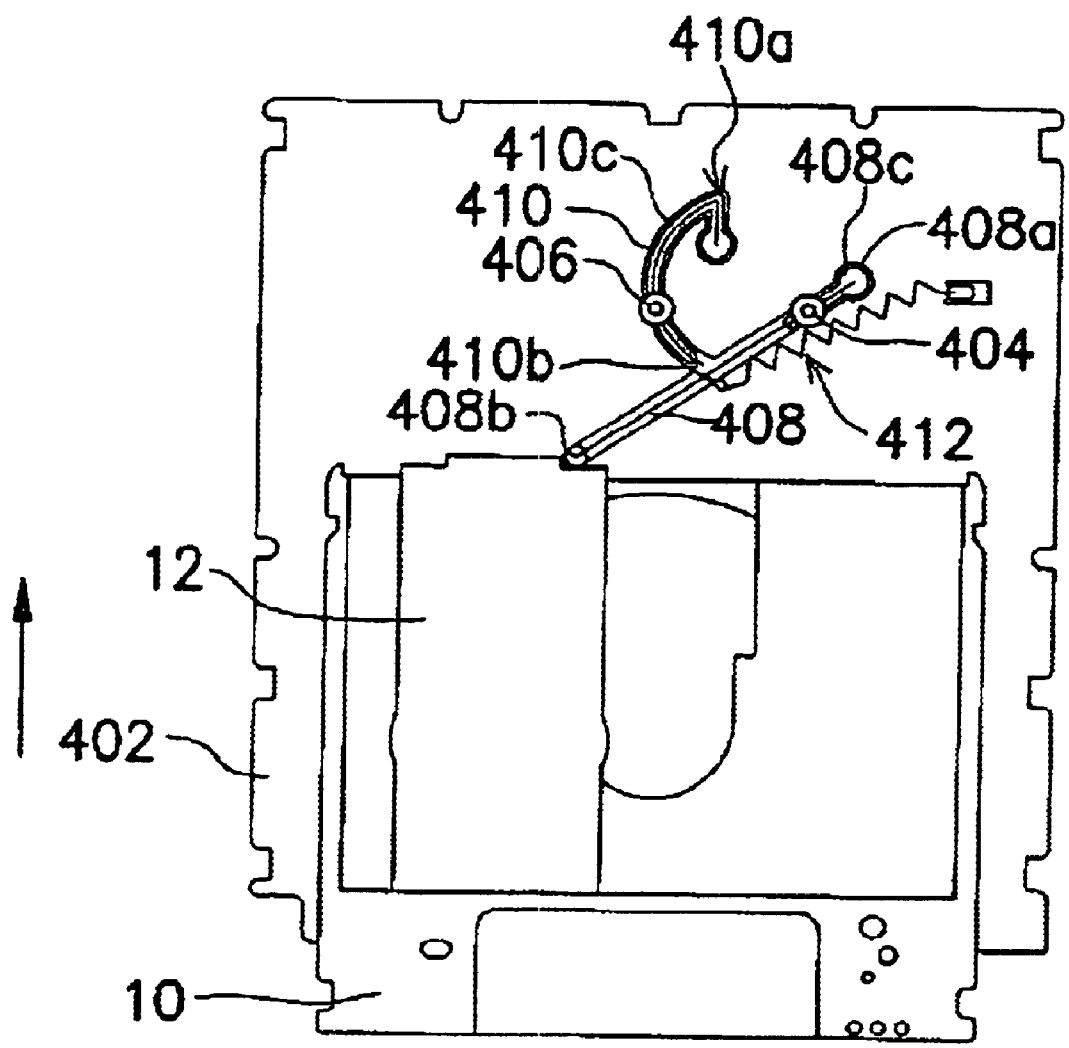
Figure 10C:
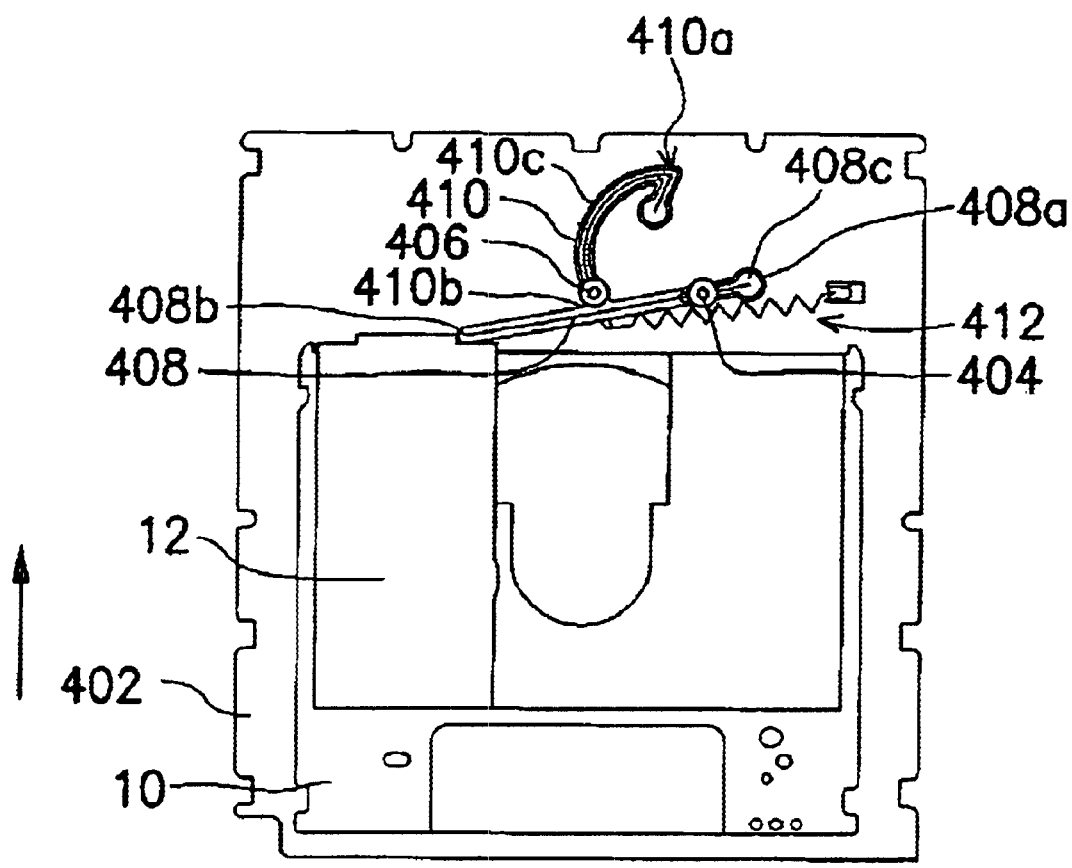

FIGS. 10A through 10C are the respective initial, intermediate and final positions of the shutter door 12 of the disk cartridge 10 being opened by the shutter door opener 400 according to the third preferred embodiment of this invention. First, as shown in FIG. 10A, the disk cartridge 10 is pushed into the cartridge holder of the disk reader (not shown) in the direction as indicated. The second end 408b of the opener beam 408 is shown to be touching point B of the shutter door 12. As the cartridge 10 is further pushed, the opener beam 408 starts to slide relative to the first pin 404 so that the shutter door 12 starts to open.

In FIG. 10B, the opener beam 408 is shown to open the shutter door 12 a little bit more. In the meantime, the slot beam 410 through slot 410c slides past the second pin 406 in the direction as indicated by the arrow. At the same time, the extensible element 412 extends a little longer.

In FIG. 10C, the slot beam 410 continues to slides past the second pin 406 following the direction as indicated by the arrow. Finally, the movement stops when the second pin 406 has reached the very end of the slot 410c near the second end 410b of the slot beam 410. The shutter door 12 is now fully opened inside the disk reader. Since the extensible element 412 is now fully stretched, a potential restorative force is present. Now that the shutter door on the cartridge is fully opened, data can be read out or written into the disk. When the cartridge 10 is no longer needed, it can be retracted back. As soon as the disk cartridge 10 is pulled out, the restorative force provided by the extensible element 412 is able to return the shutter door opener 400 to its former configuration.

Note that the number of pins on the chucking plate is not restricted to two in the illustration. For reasons such as maintaining the distance between the shutter door opener and the chucking plate or others, the number of pins put on the chucking plate can be increased as long as movement and functionality of the opener beam remains. In addition, a matching number of slots for accommodating the pins can also be formed.

In summary, the shutter door opener of this invention has many advantages over a conventional opener. First, the shutter door on a disk cartridge can be opened and shut automatically. Second, the number of elements needed to build the opener is small and the elements are easy to manufacture, thereby saving much assembling time. Third, the opener beam of the opener is capable of translational as well as rotational movement. Therefore, area swept out by the beam is small and so the entire opener can be accommodated within a smaller area. Fourth, minimum friction exists between the elements when the opener operates. Thus, jamming at dead points is less frequent.

Fifth, the profile and curvature of the slot on the chucking plate can be designed according to the amount of movement demanded by the shutter door, unlike the fixed arc trajectory followed by the opener beam of a conventional opener. Finally, the overall length of a stretched spring is shorter than one used in a conventional opener. Hence, permanent deformation of the spring happens less readily.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An opener on a chucking plate inside a disk reader for opening the shutter door of a disk cartridge, comprising:

an opening element that includes an opener beam section and a slot section, wherein the head of the beam section further includes a slider, and a fixed pin constrained within and passing through the slot section and fastened to the chucking plate permitting the opening element to slide as well as to rotate freely;

a first slot on the chucking plate such that the first slot is capable of engaging the slider at the head of the opening element and permitting the slider to slide inside the first slot having a linear shaped trajectory;

an extensible element with one end fastened onto the chucking plate while the other end is fastened to a lock pin on the opener beam; and a second slot on the chucking plate that permits the lock pin to slide inside the second slot having a shaped trajectory.

2. The opener of claim 1, wherein the opening element is made from a material including plastic.

3. The opener of claim 1, wherein the opening element is formed by an injection molding method.

4. The opener of claim 1, wherein the extensible element includes an extension spring.

5. The opener of claim 1, wherein the fixed pin is fastened to the chucking plate using a C-type retainer ring.

6. The opener of claim 1, wherein the second slot has a V shape.

7. The opener of claim 1, wherein the chucking plate includes a base metal plate.

8. An opener on a chucking plate inside a disk reader for opening the shutter door of a disk cartridge, comprising:

a first pin and a second pin fastened to the chucking plate;

an opener beam having a first end and a second end, wherein the first end forms a pivot point with the first pin so that the opener beam is able to rotate about the pivot point;

a slot beam having a first end, a second end and a slot, wherein the second pin passes through the slot so that the slot beam is able to slide relative to the second pin, and furthermore the second end is coupled to a section of the opener beam between its two ends;

a connecting beam whose ends join with the first end of the opener beam and the first end of the slot beam, respectively; and an extensible element with one end fastened to the opener beam while another end is fastened to the chucking plate.

9. The opener of claim 8, wherein the opener beam, the slot beam and the connecting beam can be formed as a single piece.

10. The opener of claim 8, wherein the opener beam, the slot beam and the connecting beam can be made from a plastic material.

11. The opener of claim 8, wherein the extensible element includes an extension spring.

12. The opener of claim 8, wherein the opener further includes a first retainer ring for locking the first pin and a second retainer ring for locking the second pin.

13. An opener on a chucking plate inside a disk reader for opening the shutter door of a disk cartridge, comprising:

a first pin and a second pin fastened to the chucking plate;

an opener beam having a first end, a second end and a slot, wherein the first pin passes through the slot so that the opener beam is able to slide relative to the first pin;

a slot beam having a first end, a second end and a slot, wherein the second pin passes through the slot so that the slot beam is able to slide relative to the second pin, and furthermore the second end is coupled to a section of the opener beam between its two ends; and an extensible element with one end fastened to the opener beam while another end is fastened to the chucking plate.

14. The opener of claim 13, wherein the opener beam and the slot beam can be formed as single piece.

15. The opener of claim 13, wherein the opener beam and the slot beam can be made from a plastic material.

16. The opener of claim 13, wherein the extensible element includes an extension spring.

17. The opener of claim 13, wherein the opener further includes a first retainer ring for locking the first pin and a second retainer ring for locking the second pin.

* * * * *